United States Patent [19]
Winchester

[11] Patent Number: 5,346,342
[45] Date of Patent: Sep. 13, 1994

[54] SHAFT LOCK ARRANGMENT FOR A POWER TOOL

[75] Inventor: Charles D. Winchester, Easley, S.C.

[73] Assignee: Ryobi Motor Products Corp., Easley, S.C.

[21] Appl. No.: 34,547

[22] Filed: Mar. 19, 1993

[51] Int. Cl.⁵ .............................................. B23C 1/20
[52] U.S. Cl. ................................ 409/134; 144/136 C; 200/43.17; 200/321
[58] Field of Search ................ 408/710; 409/134, 181, 409/182, 231; 144/134 D, 136 C; 200/334, 323, 324, 321, 43.17, 43.11

[56] References Cited

U.S. PATENT DOCUMENTS

| | | | |
|---|---|---|---|
| 2,702,098 | 2/1955 | Staak. | |
| 2,807,732 | 9/1957 | Kurtovich | 408/710 |
| 2,897,302 | 7/1959 | Godfrey et al. | 408/710 |
| 3,487,747 | 1/1970 | Burrows et al. | 409/182 |
| 3,511,947 | 5/1970 | Eikermann et al. | 408/710 |
| 5,152,327 | 10/1992 | Shoda | 409/134 |
| 5,191,968 | 3/1993 | McCurry | 144/136 C |

Primary Examiner—Daniel W. Howell
Attorney, Agent, or Firm—Brooks & Kushman

[57] ABSTRACT

A shaft lock arrangement having a shaft lock slidably mounted in the housing of a power tool. The shaft lock has a keyhole-shaped aperture having a circular portion circumscribing the output shaft of the power tool when the shaft lock is in a RUN position and a rectangular portion, the sides of which straddle flat portions of the output shaft preventing the output shaft from rotating when the shaft lock is in the LOCKED position. The shaft lock further has a run detent resiliently engaged by a toggle of a cut-out switch to hold the shaft lock in the RUN position and a lock detent resiliently engaged by the toggle of the cut-out switch to hold the shaft lock in the LOCKED position. The cut-out switch prevents electrical power from applied to the motor of the power tool when the shaft of the power tool is locked by the shaft lock.

17 Claims, 2 Drawing Sheets

SHAFT LOCK ARRANGMENT FOR A POWER TOOL

TECHNICAL FIELD

The invention is related to power tools having a rotating shaft and, in particular, to a shaft lock and lock-out switch arrangement for a router.

BACKGROUND ART

In power tools, such as a circular saw or router, an internal electric motor has a rotating shaft coupled to a cutting tool at an exposed end. These cutting tools are selectively mounted to or removed from the shaft depending upon the work to be performed by the cutting tool. It is a convenience to the operator, if the rotation of the shaft can be inhibited during the mounting or removal of the cutting tool since the mounting or removal of the cutting tool requires a rotary motion about an axis concentric with the shaft. Preferably, the mechanism for locking the shaft should also inhibit electrical power from being applied to the electric motor when the rotation of the shaft is inhibited to prevent damage to the motor or causing it to overheat.

Shaft locking mechanisms which include electrical cut-out switches to prevent electrical power from being applied to the motor when the shaft is locked are known in the art. Godfrey et al, in U.S. Pat. No. 2,897,302, discloses a control mechanism for the ON/OFF switch of a router which automatically locks the shaft when the electrical switch is placed in the OFF position and release the shaft when the electrical switch is placed in the ON position. In an alternate arrangement disclosed by McCurry in U.S. patent application Ser. No. 07/764,239, filed Sep. 23, 1991, discloses a shaft lock mechanism having a first position in which the shaft is locked and a cut-out switch is placed in an open position and is manually displaceable to a second position in which the shaft is free to rotate and the cut-out switch is placed in a closed position.

The invention is an improved shaft lock mechanism for a power tool.

SUMMARY OF THE INVENTION

The invention is a shaft lock arrangement for a power tool. The power tool being of the type having a housing, an electric motor mounted in the housing, an output shaft rotated by the electric motor and an ON/OFF switch selectively supplying electrical power to the electric motor from an external source of electrical power. The shaft lock arrangement consists of a non-circular portion provided at one end of the shaft and a shaft lock disposed in the housing engageable with the non-circular end of the output shaft. The shaft lock is displaceable from a RUN position in which the shaft lock is disengaged from the output shaft to a LOCKED position in which the shaft lock engages the non-circular end of the output shaft and prevents it from rotating. The shaft lock has a through aperture receiving the end of the output shaft. The through aperture having at least one portion lockingly engaging the non-circular portion of the output shaft preventing it from rotating when the shaft lock is in the LOCKED position. The shaft lock further has a run and a locked detent. A lock-out switch mounted in the housing and connected in series with the ON/OFF switch has a toggle to switch the lock-out switch from an open state to a closed state. The toggle is resiliently biased to engage the run detent when the shaft lock is in the RUN position and to engage the locked detent when the shaft lock is in the LOCKED position. The toggle is biased to produce a force sufficient to hold the shaft lock, alternatively in either the RUN or LOCKED positions. The lock-out switch is placed in a closed state when the toggle is in the RUN detent and in an open state when the toggle is in the LOCKED detent.

In the preferred embodiment, the non-circular portion of the output shaft has a pair of flat surfaces disposed on opposite sides and the through aperture has a keyhole shape having a circular portion circumscribing the shaft when the shaft lock is in the RUN position and a rectangular portion straddling the pair of flat surfaces when the shaft lock is in the LOCKED position.

One advantage of the shaft lock mechanism is that the electrical power to the motor is cut-off when the shaft lock is in the LOCKED position.

Another advantage of the shaft lock mechanism is that the force of the biased toggle of the cut-off switch holds the shaft lock in either the RUN or LOCKED positions eliminating the need for separate detent mechanisms.

These and other advantages of the shaft lock and lock-out mechanisms will become more apparent from a reading of the specification in conjunction with the drawings.

BEST MODE FOR CARRYING OUT THE INVENTION

Figure 1:
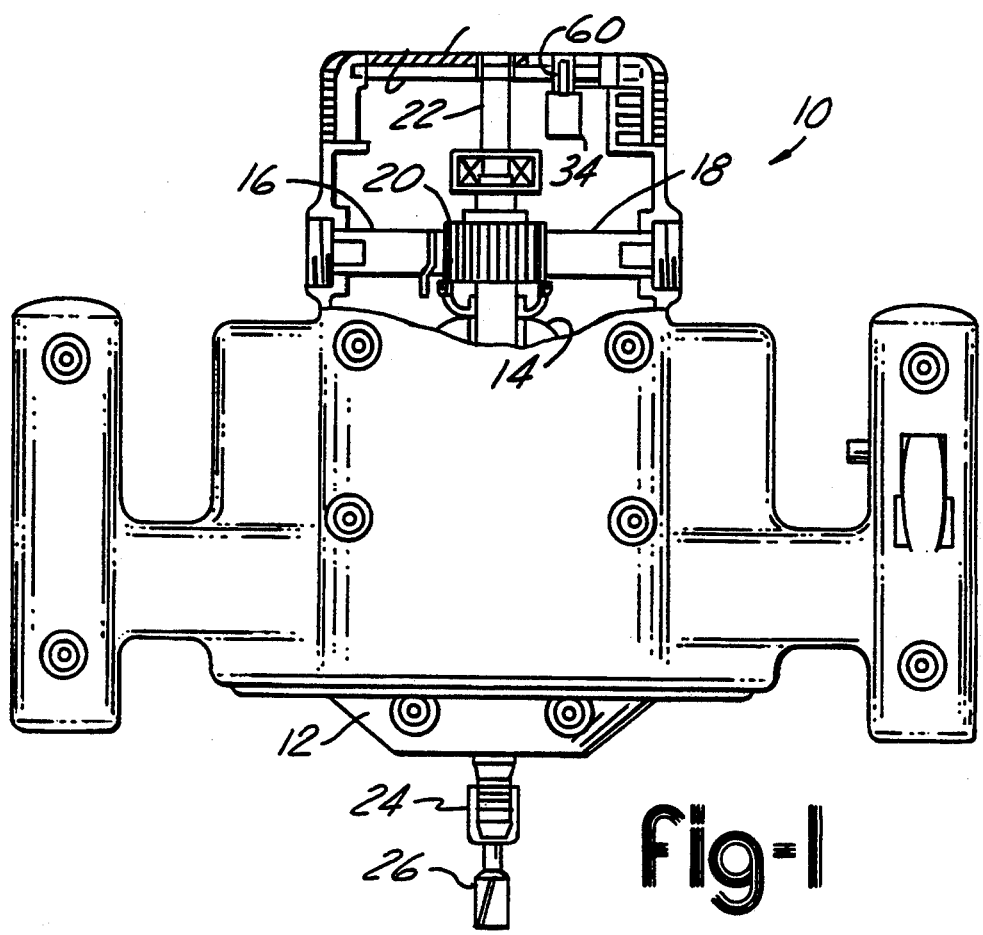
FIG. 1 is a partial cross-sectional front view of a router.

FIG. 1 illustrates a router, designated generally by reference numeral 10, embodying the shaft lock and cut-out switch mechanism according to the invention. The router 10 includes a main housing 12 in which is mounted an electric motor 14 in a conventional manner. Electric power is supplied to the electric motor through a pair of brushes 16 and 18 which engage a commutator 20. The electric motor 14 has a rotary output shaft 22 which extends at its lower end external to the housing 12. A collet 24 to which an operator may attach a suitable cutting tool, such as a router bit 26, is attached to the lower end of output shaft 22. The router 10 also has a main power switch 28 (FIG. 6) by means of which an operator may supply electrical power to the motor 14 to rotate the motor's output shaft 22 to effect a cutting operation.

In order to change the cutting tools, it is a convenience for the operator to be able to mechanically lock the output shaft 22 against rotation. It is also desirable to prevent electrical power from being applied to the motor 14 when the output shaft is mechanically locked.

Figure 4:
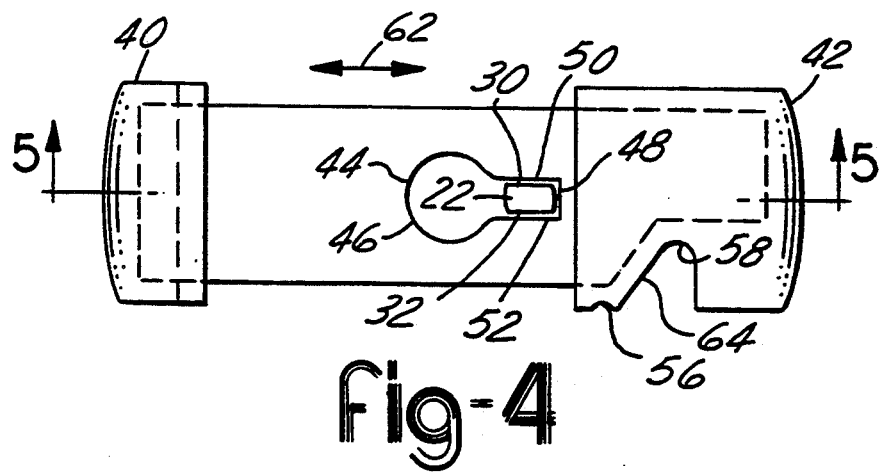
FIG. 4 is a top view of the shaft lock.

To accommodate the mechanical locking of the output shaft 22, its upper end is provided with a non-circular parallel flat portions 30 and 32 shown in FIG. 4. A cut-out switch 34, such as Arklers single pole single throw switch, model number S-2111SR10-0 is connected in series with the main power switch 28 and is switched to an open state whenever the shaft 22 is mechanically locked against rotation. This prevents electrical power from being applied to the motor 14 when the shaft 22 is locked.

Figure 2:
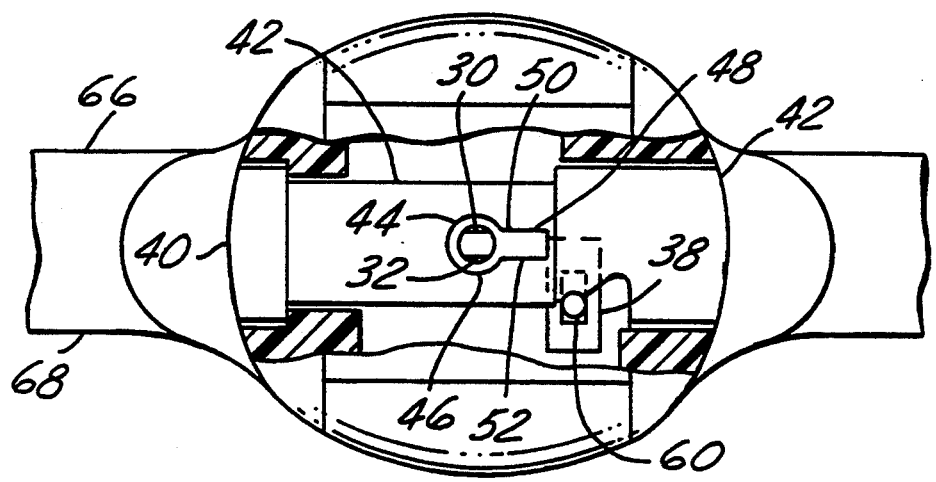
FIG. 2 is a partial cross-sectional top view of the router with the shaft lock in the RUN position.

The mechanism for locking the output shaft is a shaft lock 36 provided in the housing 12 adjacent to the upper end of the output shaft 22. The shaft lock 36 is received in rectangular openings on opposite sides of the housing 12 and is manually displaceable by the operator in a direction transverse to the output shaft 22 from an UNLOCKED or RUN position, shown in FIGS. 1 and 2 to a LOCKED position, shown in FIG. 3.

Figure 5:
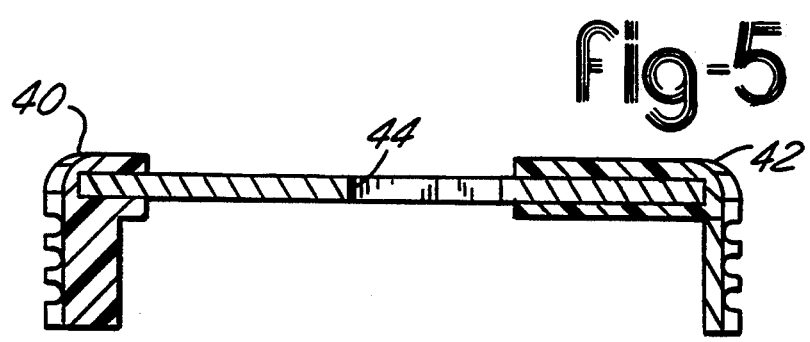
FIG. 5 is a cross-sectional side view of the shaft lock.

The shaft lock 36, shown more clearly in FIGS. 4 and 5 consists of a lock plate 38 and a pair of end members 40 and 42. The end members 40 and 42 may be molded directly into the lock plate 38 or may be pressed onto the ends of the lock plate 38 in a conventional manner. The end members 40 and 42 have external contours which mate with the adjacent external contour of the housing. The lock plate 38 has a keyhole-shaped aperture 44 having a circular portion 46 which circumscribes the output shaft 22 when the shaft lock 36 is in the UNLOCKED or RUN position, and a rectangular portion 48 which straddles the parallel flat portions 30 and 32 of the output shaft 22 when the shaft lock 36 is in the LOCKED position.

Figure 3:
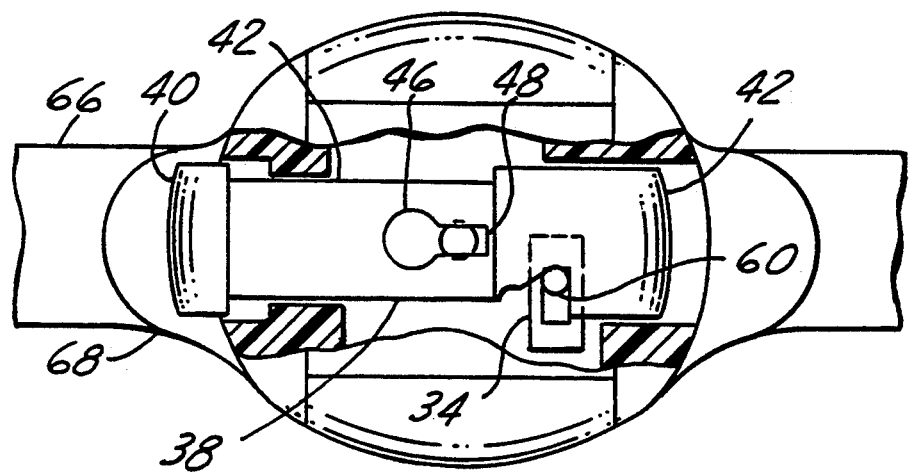
FIG. 3 is a partial cross-sectional top view of the router with the shaft lock in the LOCKED position.

The distance between the parallel sides 50 and 52 of the rectangular portion 48 is selected to be slightly greater than the distance between the parallel flat portions 30 and 32 of the output shaft 22 so that when the flat portions 30 and 32 of the output shaft 22 are oriented parallel to the parallel sides 50 and 52 of the rectangular portion 48, the lock plate 38 may be displaced to the locked position as illustrated in FIGS. 3 and 4. In the locked position, the parallel sides 50 and 52 of the rectangular portion 48 prevent the rotation of the output shaft 22 permitting the collet 24 to be rotated relative to the shaft 22 enabling the mounting and/or removal of a cutting tool.

The end member 42 has a run detent 56 and a lock detect 58 which, in the alternative, are engaged by the toggle 60 of the lock-out switch 34. The run and lock detents 56 and 58 are spaced apart in a direction parallel to the direction of motion of the shaft lock 36 indicated by double-headed arrow 62 and are offset from each other in a direction normal to the direction of motion. When the shaft lock 36 is in the RUN position, the toggle 60 of the lock-out switch 34 is engaged in the run detent 56, which closes lock-out switch 34, permitting electrical power to be applied to the motor 14. In the alternative, when the shaft lock 36 is placed in the LOCKED position in which the shaft 22 is prohibited from rotating, the toggle 60 is engaged in lock detent 58. A ramp 64 is provided between run detent 56 and lock detent 58 to facilitate the displacement of the toggle 60 from lock detent 58 to RUN detent 56 when the shaft lock 36 is manually displaced from the LOCKED position to the RUN position.

The toggle 60 of the lock-out switch 34 is resiliently biased to the normally open position with a force sufficient to hold the shaft lock 36 in the RUN position when the toggle 60 is in run detent 56 and in the locked position when the toggle 60 is in lock detent 58. This eliminates the need for any other type of holding mechanism to secure the shaft lock 36 in either the RUN or LOCKED positions.

The housing 12 consists of two clam shell members 66 and 68 which are secured to each other by screw-type fasteners 70 at various locations. Each clam shell member 66 and 68 has a portion of a top 72 which secures the shaft lock 36 in the housing as shown in FIG. 1.

Figure 6:
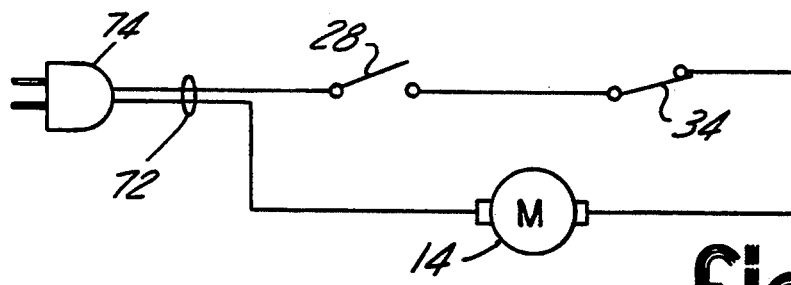
FIG. 6 is a circuit diagram of the router.

Referring to FIG. 6, electrical power is supplied to the electric motor 14 via a line cord 72 having a male connector plug 74 receivable in a standard household electrical outlet. As previously stated, the cut-out switch 34 is connected in series between the main power switch 28 and the electric motor 14.

While a best mode embodiment of the shaft lock and lock-out switch arrangement has been disclosed herein, it is understood that various modification and improvements will be apparent to those of ordinary skill in the art within the scope of the invention as set forth in the appended claims.

What is claimed is:

1. A shaft lock arrangement for a power tool, the power tool having a housing, an electric motor having a rotary output shaft mounted in the housing and an ON/OFF electrical switch to selectively provide electrical power to the motor from a source of electrical power, said shaft lock arrangement comprising:

a non-circular portion provided on one end of said output shaft;

a shaft lock slidably displaceable in a direction normal to said output shaft between a run position and a lock position, said shaft lock mounted in said housing adjacent to said one end of said output shaft and having a through aperture receiving said one end of said output shaft therein, said through aperture having at least a locking portion engageable with said non-circular portion of said output shaft when said shaft lock is in said locked position prohibiting the rotation of said output shaft, a run detent and a locked detent;

a lock-out switch mounted in said housing and connected in series with said ON/OFF switch, said lock-out switch having a toggle to switch said lock-out switch from an open state to a closed state, said toggle resiliently biased to engage said run and said locked detents to hold said shaft lock in said run and locked positions respectively, said toggle when engaged in said run detent placing said lock-out switch to said closed state and when engaged in said locked detent placing said lock-out switch to said open position.

2. The shaft lock arrangement of claim 1 wherein said shaft lock comprises:

a lock plate having said through aperture;

a first end member attached to one end of said lock plate; and a second end member attached to an opposite end of said lock plate, said second end member having said run detent and said lock detent.

3. The shaft lock arrangement of claim 1 wherein said non-circular portion of said shaft comprises opposed flat portions and wherein said through aperture is a keyhole-shaped aperture having a circular portion circumscribing said one end of said shaft when said shaft lock is in said run position and wherein said locking portion is a rectangular portion straddling said flat portions of said shaft when said shaft lock is in said locked position.

4. The shaft lock arrangement of claim 1 wherein said run detent is spatially separated from said lock detent in a direction parallel to said shaft lock direction of displacement and are spatially separated from each other in a direction normal to said shaft lock direction of displacement.

5. The shaft lock arrangement of claim 4 including a ramp provided between said run detent and said lock detent to facilitate the displacement of said toggle when said shaft lock is displaced from said locked position to said run position.

6. The shaft lock arrangement of claim 2 wherein said first and second end members have external contours mating with the external contour of said housing when said shaft lock is in said run position.

7. A shaft lock mechanism for a router having a housing, an electric motor mounted in the housing, an output shaft rotated by the electric motor, a non-circular portion provided at one end of the output shaft, an ON/OFF switch for selectively providing electrical power to the motor and means for supplying electrical power to the router from a source of electrical power, said shaft lock mechanism comprising:

a shaft lock mounted in the housing engageable with the non-circular portion of the output shaft, said shaft lock slidably displaceable in said housing between a run position and a locked position, said shaft lock disengaged from said non-circular portion of said output shaft in said run position permitting the output shaft to be rotated by the electric motor and engaged with said non-circular portion of said output shaft in said locked position prohibiting the rotation of the output shaft by the electric motor, said shaft lock further comprising a run detent and a locked detent; and a lock-out switch mounted in said housing and connected in series with said ON/OFF switch, said lock-out switch having a resiliently biased toggle engageable with said run detent to hold said shaft lock in said run position and engageable with said locked detent to hold said shaft lock in said locked position, said lock-out switch having a closed state when said toggle is in said run detent and an open state when said toggle is in said locked detent, said lock-out switch in said open state preventing the application of electrical power to the electric motor.

8. The shaft lock mechanism of claim 7 wherein said non-circular portion of the output shaft consists of parallel flat surfaces provided on opposite sides of said one end and wherein said shaft lock has a keyhole-shaped aperture provided therethrough, said keyhole-shaped aperture having a circular portion circumscribing said one end of said output shaft when said shaft lock is in said run position and a rectangular portion straddling said parallel flat surfaces when said shaft lock is in said locked position.

9. The shaft lock mechanism of claim 8 wherein said shaft lock comprises:

a lock plate having said keyhole-shaped aperture;

a first end member attached to one end of said lock plate; and a second end member attached to an opposite end of said lock plate, said second end member having said run detent and said lock detent.

10. The shaft lock mechanism of claim 7 wherein said shaft lock mechanism is displaceable in a direction transverse to said output shaft.

11. The shaft lock mechanism of claim 10 wherein said run and lock detents are displaced from each other in a direction parallel to said direction of displacement of said shaft lock and in a direction transverse to said direction of displacement.

12. The shaft lock mechanism of claim 7 including a ramp connecting said run detent and said lock detent to facilitate the displacement of said toggle from said lock detent to said run detent when said shaft lock is displaced from said locked position to said run position.

13. The shaft lock mechanism of claim 7 wherein said lock plate is a metal plate and said first and second end members are molded plastic members.

14. The shaft lock mechanism of claim 13 wherein said first and second end members have external contours mating with the adjacent contours of said housing when said shaft lock is in said run position.

15. A shaft lock mechanism for a router having a housing, an electric motor mounted in the housing, an output shaft rotated by said electric motor, an electrical cord for providing electrical power to said electric motor from an external source, and an ON/OFF switch connected in series between said electrical cord and said electric motor for selectively connecting said electrical power to said motor, said shaft lock and electrical power cut-off mechanism comprising:

parallel flat portions provided on opposite sides of said output shaft adjacent to one end thereof;

a shaft lock mounted in said housing engageable with said one end of said output shaft, said shaft lock slidably displaceable between a run position and a locked position, said shaft lock having a keyhole-shaped through aperture, said keyhole-shaped through aperture having a circular portion circumscribing said one end of said output shaft when said shaft lock is in said run position and a rectangular portion straddling said parallel flat portions of said output shaft when said shaft lock is in said locked position; and a cut-out switch connected in series with said ON/OFF switch, said cut-out switch having a closed state in response to said shaft lock being in said run position and an open state in response to said shaft lock being in said locked position, said cut-out switch having a resiliently biased toggle engageable with said shaft lock to, in the alternative, hold said shaft lock in either the run or locked positions.

16. The shaft lock mechanism of claim 15 wherein said shaft lock has a first detent engageable by said toggle to hold said shaft lock in said run position and a second detent engageable by said toggle to hold said shaft lock in said locked position.

17. A shaft lock mechanism for a power tool having a housing, an electric motor mounted in the housing, an output shaft rotated by the electric motor, an ON/OFF switch for selectively providing electrical power to the electric motor, said shaft lock mechanism comprising:

a shaft lock slidably mounted in said housing transverse to the output shaft, said shaft lock displaceable between a run position permitting a free rotation of said output shaft and a locked position engaging said output shaft and preventing its rotation, said lock shaft further having a run detent and a lock detent; and a cut-out switch mounted in said housing and connected in series with said ON/OFF switch, said cut-out switch having a toggle resiliently biased to engage said run detent with a force sufficient to hold said shaft lock in said run position and to engage said lock detent with a force sufficient to hold said shaft lock in said locked position, said cut-out switch being closed when said toggle is in said run detent and open when said toggle is in said lock detent.

\* \* \* \* \*